March 14, 1933.  A. PFAU  1,901,771

HYDRAULIC TURBINE CONTROL SYSTEM

Filed July 23, 1931  2 Sheets-Sheet 1

Inventor
A. Pfau
by
Attorney

March 14, 1933.  A. PFAU  1,901,771
HYDRAULIC TURBINE CONTROL SYSTEM
Filed July 23, 1931  2 Sheets-Sheet 2
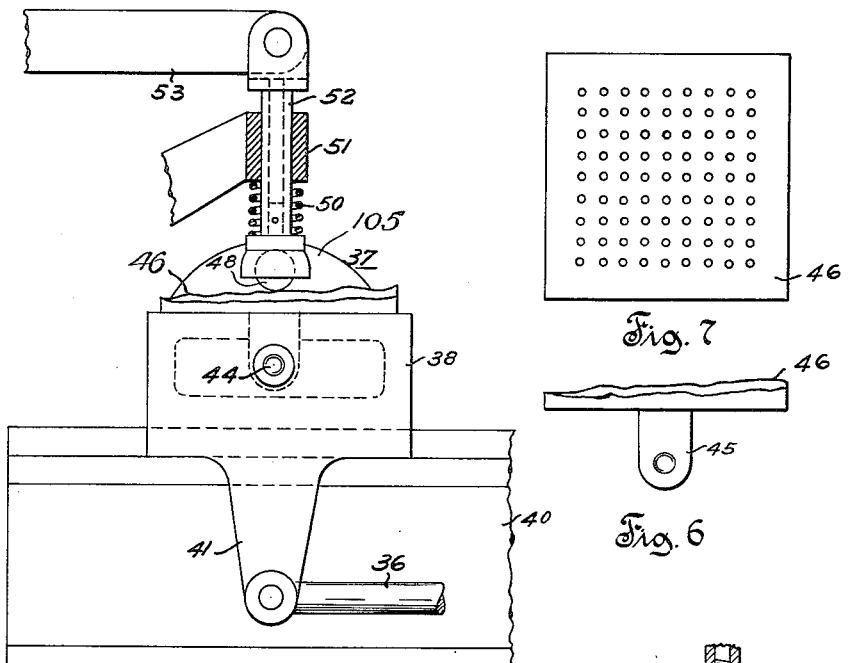
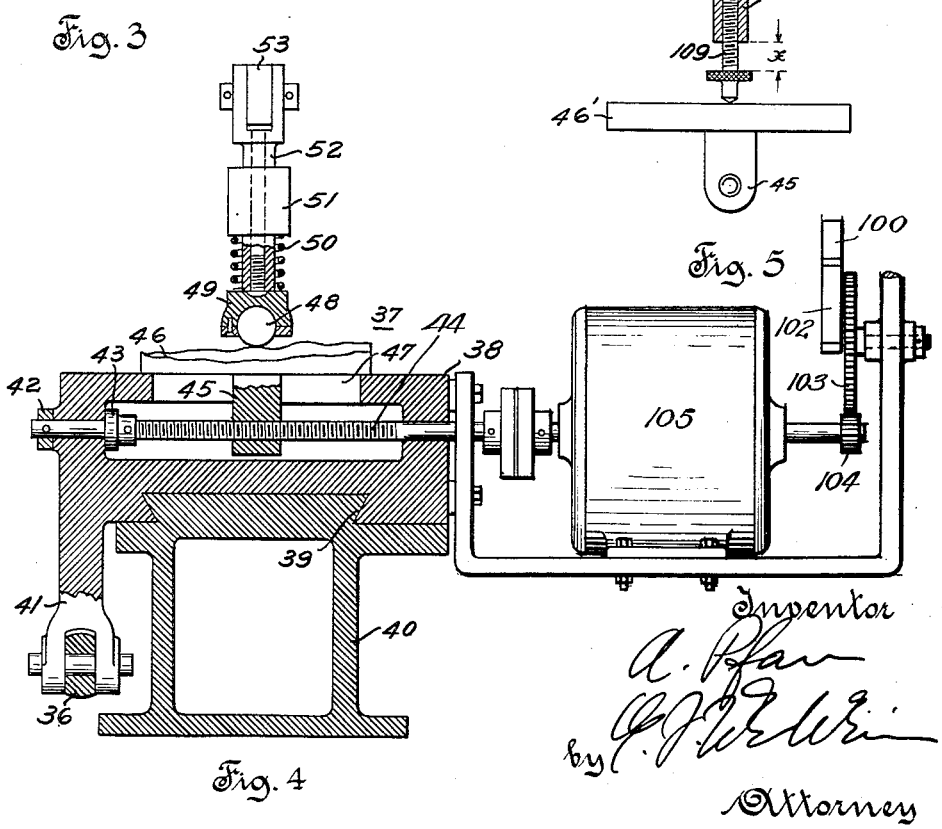

Patented Mar. 14, 1933

1,901,771

UNITED STATES PATENT OFFICE

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

HYDRAULIC TURBINE CONTROL SYSTEM

Application filed July 23, 1931. Serial No. 552,639.

This invention relates in general to hydraulic turbines, and more in particular to a control system of the type shown in British Patent No. 245,583, complete accepted January 14, 1926 for controlling the tilt of adjustable rotor blades in accordance with the effective head of water and the load on the turbine.

It is known that the efficiency of hydraulic turbines with non-adjustable rotor blades is "peaky", that is, the efficiency drops off rapidly at low loads and at low effective heads of water. It is also known that by adjusting the tilt or angle of the runner blades the efficiency can be improved over a wide range of operating conditions. Tests have shown that when operating at a variable head the proper interrelation between the guide vane opening and the runner tilt for best efficiency varies as the effective head varies but does not follow any definite or fixed proportionality.

It is therefore an object of this invention to provide a practical operative control system for hydraulic turbines in which the tilt of the rotor blades is automatically adjusted by means of a topographic cam controlled servo-motor in accordance with the movement of the guide vanes, this adjustment being modified by the effective head of the water.

A further object of this invention is to provide a method of making topographic cam member for the above control system.

It is also an object of the invention to increase the efficiency of a hydraulic turbine by providing a remotely controlled servo-motor for tilting the runner blades in accordance with both the guide vane opening and the effective head of water.

These and other objects and advantages are attained by this invention, various novel features of which will be apparent from the description and drawings herein, and will be more particularly pointed out in the claims.

Various illustrative examples of the application of this invention are shown in the accompanying drawings in which:

Fig. 3 shows a side elevation of the topographic cam device.

Fig. 4 shows an end section of the topographic cam device.

Fig. 5 shows an end view of a blank from which a topographic cam is constructed.

Fig. 6 shows an end section of the topographic cam member.

Fig. 7 shows a top view of the topographic cam member.

Figures 1, 2:
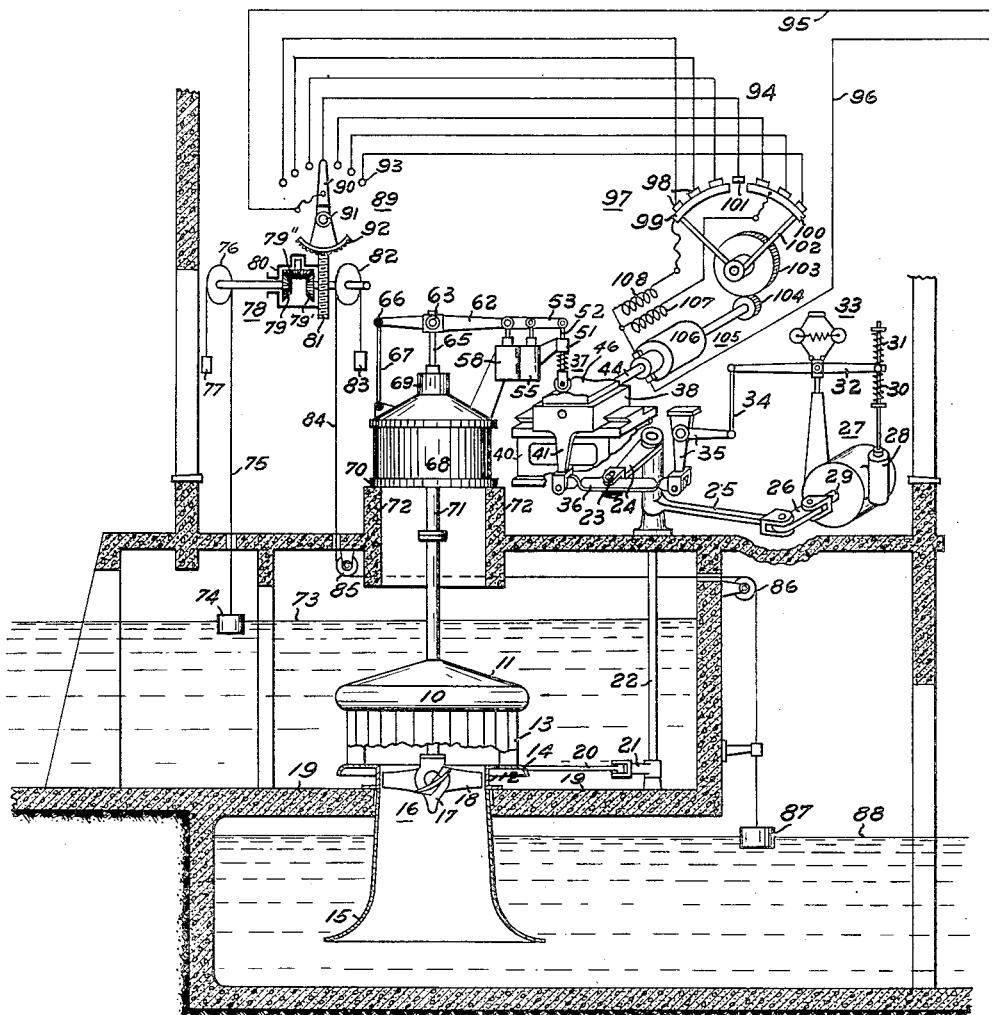
Fig. 1 shows a control system for a hydraulic turbine embodying the present invention.
Fig. 2 shows more in detail the construction of the rotor blade tilting servo-motor and its control valve.

With the above objects in view, as well as other objects which will appear as the specification proceeds, the invention comprises a construction, arrangement and combination of parts now to be fully described and hereinafter claimed; it being understood that the disclosure herein described is merely illustrative of the invention and is not to be taken in a limiting sense, changes in details of construction and arrangement of parts being permissible so long as within the spirit of the invention and the scope of the claims which follow.

Referring now to Fig. 1, 10 is a hydraulic turbine mounted on foundation 19 and having an upper casing 11 and a lower casing 12 with movable guide vanes 13 mounted therebetween. A guide vane actuating ring 14 is rotatable about the lower casing member 12 by means of an operating rod 20. A draft tube 15 of usual construction is located below the lower turbine casing. A rotor 16 of the propeller type is provided with hub member 17 containing suitable mechanism for tilting the blades 18, noting the patent to J. J. Ring, U. S. 1,685,756, September 25, 1928, for a typical showing of such mechanism.

The guide vanes 13 are adjustably moved by servo-motor 27 by means of piston rod 29, link 26, arm 25, rod 22, crank 21 and rod 20. A conventional governor 33 is driven in accordance with the speed of the turbine by conventional means (not shown) to position floating lever 32 which in turn controls valve 28 through springs 30 and 31. The left end of floating lever 32 is connected to a bell-crank 35 by means of rod 34 and serves to relay the movement of the guide vanes through rod 20, crank 21, rod 22, crank 24, and link member 36 to the left end of floating lever 32. Link member 36 also serves to relay the motion of the guide vanes to the carriage member 38 of topographic cam device 37 through the above described linkage and arm 41, noting that pivot point 23 permits link 36 to move up and down slightly relative to arm 24.

The construction of topographic cam device 37 can best be understood by referring to Figs. 3 and 4 in which 40 is a stationary base member and 38 is a carriage longitudinally movable on member 40 by virtue of the interlocking guide ways 39. Carriage member 38 is provided with depending arm 41 having means for connection to link 36. Carriage 38 also has a guide slot 47 in which the depending member 45 of topographic cam 46 is slidable. This member 45 is internally threaded to receive the threaded portion of rod 44 which is driven by motor 105 as will be more fully described hereafter. Shaft 44 is supported for rotation in carriage member 38 and is prevented from moving longitudinally by collars 42 and 43 fastened thereto. A steel ball 48 is pressed into engagement with the surface of topographic cam 46 by means of spring 50 which presses at one end against stationary guide 51 and against ball socket 49 at the other end. The radius of the steel ball 48 should be less than the shortest radius of curvature of the cam surface over which it travels so that the ball will not ride over any depressions in the cam surface. Socket member 49 is connected to floating lever 53 by means of a plunger member 52 which is slidable in the stationary guide 51.

Referring to Fig. 2, the valve 55 is operated by valve actuating rod 54 which is connected to an intermediate point of the floating lever 53. Valve 55 serves to admit operating fluid under pressure from inlet pipe 56 into either chamber of servomotor 58 depending upon the position of the valve operating rod 54. When either chamber is connected to the source of fluid pressure the other chamber is connected to the drain pipe 57. Piston 59 is connected to tilting lever 62 by means of piston rod 60 and connection 61. A rotor blade tilting rod 65 is attached to lever 62 intermediate its ends by means of thrust bearing 63 and collar 64 which is on rod 65. Rod 65 extends from the blade tilting mechanism in hub 16 and extends through hollow shaft 71 to the aforementioned thrust bearing. The left end of lever 62 is connected to link 67 which in turn is connected at its lower end to the generator frame and at its upper end to pivot point 66. Generator 68 has an upper bearing 69 through which shaft 71 extends and also has a supporting ring 70 which is mounted on foundation 72.

Gear 79 of differential device 78 is rotated by pulley 76 in accordance with the level of the head water 73, by means of rope 75 which passes over the pulley 76 and is attached at one end to float 74 and at the other end to weight 77.

Gear 79' of differential device 78 is rotated by pulley 82 is accordance with the level of the tail water 88 by means of a rope 84 which passes over pulleys 82, 85, and 86 and is attached at one end to float 87 and at the other end to weight 83. Differential device 78 comprises differential gears 79 and 79' driven by pulleys 76 and 82 respectively, and housing member 80 in which said gears have bearing. At least one differential pinion 79'' meshes with gears 79 and 79' to drive housing member 80 in accordance with the effective head of water, that is in accordance with the difference between the levels of the head water and the tail water. Gear 81 is attached to housing member 80 and meshes with gear segments 92 of the follow-up transmitter 89. Gear segment 92 drives contact arm 90 which is rotatable about pivot point 91 and is insulated therefrom. Rotary contact arm 90 is adapted to selectively engage contacts 93 which are connected to contacts 98 of the follow-up receiver 97 through conductors 94. In some instances it is necessary that float 74 be placed a considerable distance from the turbine to obtain a true level of the head water. In such instances the use of the electrical follow-up scheme shown in Fig. 1 is of particular advantage in that long levers and ropes are unnecessary.

The follow-up receiver 97 comprises stationary contacts 98 which are adapted to be engaged by contact segments 99 and 100, these segments being separated by insulating member 101 which is slightly wider than contact 98. The contact segments 99 and 100 are supported by an insulating member 102 which is connected to a gear wheel 103. Gear 103 engages pinion 104 which is attached to the shaft of motor 105. Motor 105 comprises field windings 107—108 and an armature 106 which is connected at one end to pinion 104 and at the other end to threaded shaft 44 which traverses the topographic cam 46. It is thus seen that topographic cam 46 is moved longitudinally of the base 40 in accordance with the position of the guide vanes, and moved by motor 105 transversely of the base 40 in accordance with the effective head of water.

The topography of cam member 46 can be obtained from tests of a homologous model runner or from theoretical calculations but these methods have been found to be unsatisfactory because of the many variable factors which can not be accurately evaluated. The topography of cam member 46 is preferably obtained by running efficiency tests on each individual turbine under actual operating condition. In making the topographic cam member, a blank member 46', such as shown in Fig. 5, is placed in carriage member 38 and an adjustable micrometer screw 109 substituted for the socket member 49. This micrometer screw is then adjusted at various guide vane openings and effective heads of water to adjust the tilt of the rotor blades to obtain maximum kilowatt output. Thus by systematically operating the turbine at various effective heads and guide vane openings covering the entire range of operating conditions it is possible to obtain a number of distances X (note Fig. 5). Then by plotting the points which correspond to these various operating conditions on the surface of cam blank 46' as in Fig. 7 a number of holes can be drilled in the cam blank at the respective points to the various depths X observed during the various operating conditions. The cam blank can then be trimmed down to the level of the drill holes and a topographic cam will thereby be produced which can be used in device 37 to automatically control the tilt of the runner blades to the positions of maximum efficiency as determined by the previous test. Obviously the speed of the turbine must be kept constant and at the normal value during the tests. The proper topography of cam 46 may also be obtained by using a plurality of templates constructed from the various values of X obtained by test with various constant effective heads, or with various constant guide vane openings.

The operation of the system is as follows: Considering the turbine to be operating under normal constant speed conditions as shown in Fig. 1 upon decrease of load on turbine 10 governor fly balls 33 will cause servo-motor 27 to decrease the opening of the guide vanes and will also longitudinally shift carriage member 38 of the topographic device 37 thereby causing steel ball 48 to move to operate servo-motor valve 55 which in turn will cause servo-motor 58 to flatten the tilt of the runner blades. Upon occurrence of an increase in load the converse operation will occur.

Upon a decrease of effective head of water either due to the level of water 73 dropping or the level of water 88 rising differential device 78 will rotate the contact arm 90 of the follow-up transmitter 89 thereby energizing one of the conductors 93 through a circuit from conductor 95 through arm 90, one of contacts 93, through one of the conductors 94, through either field winding 107 or 108, and armature 106, to the other side of the line 96. Motor 105 is thereby energized and caused to rotate in such a direction as to finally move the insulating member 101 into engagement with the selected conductor 94 thereby stopping the follow-up motor 105. Motor 105 in rotating causes topographic cam member 46 to move transversely to render a different portion of the cam surface effective. Spring 50 will cause ball 48 to follow the shape of the cam and will thereby cause servo-motor 58 to adjust the tilt of the runner blades upon occurrence of a reduction in effective head. Upon occurrence of an increase of effective head the converse operation of motor 105, topographic device 37, and servo-motor 58 will occur.

It is to be noted that with the turbine operating at low effective heads of water and large guide vane openings "overgating" is automatically prevented because the topographic cam member in adjusting the tilt of the runner blades to their most efficient position limits the flattening of the runner blades under such conditions.

It is claimed and desired to secure by Letters Patent:

1. In combination, a hydraulic energy translating device having tiltable rotor blades and movable guide vanes, a topographic cam movable in one direction in accordance with the motion of said guide vanes, means comprising an electric motor responsive to the effective hydraulic head for moving said cam transversely of said direction, and means responsive to the variation in altitude of said cam for controlling the tilt of said rotor blades to maintain maximum efficiency of said translating device.

2. In combination, a hydraulic turbine having tiltable rotor blades and governor controlled guide vanes, a topographic cam longitudinally movable in accordance with the movement of said guide vanes, means responsive to the effective hydraulic head and including a follow-up device for transversely shifting said cam, and means responsive to the position of said cam for controlling the tilt of said rotor blades for maximum efficiency of said turbine.

3. In a control system for a variable head hydraulic turbine having tiltable rotor blades and adjustable guide vanes, the combination of means responsive to turbine speed for controlling the opening of said guide vanes, means including a servo-motor and a control valve therefor operated by a floating lever for adjusting the tilt of said rotor blades, a topographic cam for controlling said control valve means responsive to the effective head of water for moving said cam longitudinally, and means responsive to the opening of said guide vanes for moving said cam transversely, whereby the tilt of said rotor blades is automatically controlled by the effective head of water and by the position of the guide vanes.

4. In combination, a turbine having tiltable rotor blades, and movable guide vanes, a centrifugally governed servo-motor for opening and closing said guide vanes, a servo-motor for changing the tilt of said rotor blades, a control valve for said blade tilting servo-motor, a floating lever operatively connected at one end to said blade tilting servo-motor and operatively connected at its other end to a variable pivot and connected to said valve intermediate its ends, a topographic cam member movable in response to both the differential head of water and to the position of said guide vanes to move said variable pivot whereby said control valve causes said blade tilting servo-motor to tilt said rotor blades to their most efficient angle for any guide vane opening and head of water.

5. In combination, a generator driven by a hydraulic turbine having tiltable rotor blades and adjustable guide vanes, governor means for controlling the flow of water through said guide vanes, a servo-motor mounted on the frame of said generator, means including a lever operated by said servo-motor for tilting said rotor blades, a topographic cam device having a cam element for controlling said servo-motor, means for moving said cam in accordance with the head of water, and means for moving said cam in accordance with the position of said guide vanes.

6. In combination, a turbine having tiltable runner blades and governor controlled guide vanes, a servo-motor for tilting said runner blades, and means including a topographic cam device for controlling the tilt of said runner blades, said cam device having such a contour as to prevent overgating of said turbine when operating under low effective heads of water and high guide vane openings.

7. In combination, a turbine having tiltable runner blades and an adjustable gate, governor means for controlling the flow of water through said gate, means including a movable topographic cam member for controlling the tilt of said runner blades, a differential device having one gear driven in accordance with the level of the head water, another gear driven in accordance with the level of the tail water, means responsive to the difference in rotation of said gears for transversely moving said topographic cam, and means for longitudinally moving said topographic cam in accordance with the movement of said gate.

8. In combination, a turbine having movable guide vanes for controlling the admission of operating water and tiltable propeller blades for obtaining the highest possible turbine efficiency at all loads and effective heads of water, a governor controlled servo-motor for operating the guide vanes, a second servo-motor for changing the tilt of said blades, a member having a topographic surface for controlling said second servo-motor, means including a differential device responsive to the difference in height of head and tail water and an electric follow-up motor for longitudinally shifting said member, and linkage means for transversely shifting said member in accordance with the movement of said guide vanes.

9. The method of making a topographic cam member which is adapted to be moved in a device in response to effective heads of water and guide vane openings to control the tilt of the rotor blades of a hydraulic turbine in accordance with the altitude of a control member which comprises the steps of placing a blank cam member in said device; moving said blank member to positions corresponding to various heads and guide vane openings; adjusting and measuring the altitude of said control member for maximum turbine efficiency at each position; and then trimming down the cam blank in accordance with the various altitudes.

10. The method of making a topographic cam member which is adapted to be moved in a device in response to effective heads of water and guide vane openings to control the tilt of the rotor blades of a hydraulic turbine in accordance with the altitude of a control member which comprises the steps of, placing a blank cam member in said device; moving said blank member to positions corresponding to various heads and guide vane openings; adjusting the altitude of said control member for maximum efficiency at each position; measuring the altitude of said control member at each position; drilling holes in the surface of said blank member at each of said positions to a depth equal to the respective altitude measured; and then trimming the blank member down to the depth of said drill holes.

In testimony whereof, the signature of the inventor is affixed hereto.

ARNOLD PFAU.